United States Patent
Deak, Sr.

(10) Patent No.: US 12,424,917 B1
(45) Date of Patent: Sep. 23, 2025

(54) MAGNETIC FLUX STORAGE CAPACITOR, ENERGY HARVESTING GENERATOR

(71) Applicant: David Deak, Sr., St James, NY (US)

(72) Inventor: David Deak, Sr., St James, NY (US)

(*) Notice: Subject to any disclaimer, the term of this patent is extended or adjusted under 35 U.S.C. 154(b) by 0 days.

(21) Appl. No.: 17/986,875

(22) Filed: Nov. 14, 2022

Related U.S. Application Data

(60) Provisional application No. 63/279,176, filed on Nov. 14, 2021.

(51) Int. Cl.
*H02K 35/06* (2006.01)
*F03G 7/08* (2006.01)
*H02K 1/34* (2006.01)

(52) U.S. Cl.
CPC .............. *H02K 35/06* (2013.01); *F03G 7/08* (2013.01); *H02K 1/34* (2013.01)

(58) Field of Classification Search
CPC .......... H02K 35/06; H02K 1/34; H02K 35/02; H03K 17/97; F03G 7/08
USPC .......................................................... 310/15
See application file for complete search history.

(56) References Cited

U.S. PATENT DOCUMENTS

| | | | | |
|---|---|---|---|---|
| 7,023,122 B2* | 4/2006 | Gang | .................... | H02K 7/1846 310/67 A |
| 9,530,585 B2* | 12/2016 | Korherr | ................ | H03K 17/97 |
| 10,855,158 B2* | 12/2020 | Hwang | .................... | H02K 5/04 |
| 2011/0254285 A1* | 10/2011 | Hanchett, Jr. | ........ | H02K 7/1853 290/1 R |
| 2016/0134173 A1* | 5/2016 | Deak, Sr. | ............. | H02K 7/1876 290/1 A |

* cited by examiner

*Primary Examiner* — Burton S Mullins

(57) ABSTRACT

An energy harvesting generator that produces power to electrical loads, by a novel method of magnetomotive stored potential energy release of magnetic flux into a coil winding by a mechanically applied external force that separates two magnetic flux sources, which initially are proximity distance separated by a thin blind hole wall disposed on a coil bobbin wound with magnet coil wire. The static magnetic flux charge state is discharged into the coil by the action of the external mechanical applied force periodically and is recharged whenever the mechanical triggering is completed, and the two separate magnets are brought into proximity. This novel methodology is magnetically equivalent to an electrical storage capacitor that stores a plurality of electrostatic flux to be charged and discharged periodically on demand.

18 Claims, 5 Drawing Sheets

100

400

US 12,424,917 B1

MAGNETIC FLUX STORAGE CAPACITOR, ENERGY HARVESTING GENERATOR

FIELD OF THE INVENTION

The present disclosure relate to the field of low power energy harvesting generators that are possible replacements for batteries in battery operated low power ISM Band transmitters and transceivers, which are utilized as wireless and battery-less data transmission devices for commercial and industrial wireless data communications.

BACKGROUND OF THE INVENTION

The general classification of "energy harvesting generators" include solar, acoustic, chemical, piezoelectric, and electromagnetic types. Of all these types the most successful are of the electromagnetic type (also known as EM type) because they offer long life, reasonable production cost, and more fitting to be shaped in many more topological configurations without compromising power output greater than all previous types considered.

There is a fair amount of EM type prior art that have been used commercially, and that prior art falls into two categories; [1] snap-action, extremely short burst pulse with a typical 2 millisecond pulse per trigger action; which are used in battery-less and wireless switches that have the advantage of producing considerable power with the disadvantage of extremely short burst power generation, and [2] an oscillatory type that produces less power than the snap-action type (per unit time) but with a much longer power generating duration time of tens-to-hundreds of milliseconds. This type is more costly to manufacture and usually incorporates a plurality of Neodymium magnets and other non-magnetic (plastic) components. They also find use in battery-less and wireless switching systems, mostly industrial, where the market can accommodate more costly solutions as the type [2] mentioned above.

SUMMARY

The present invention uses an that is quite different from the referenced prior art above. It uses a methodology that overcomes the disadvantages of those previous two types of energy harvesters mentioned above. It incorporates the operation of a "magnetomotive flux storage capacitor", analogous to the operation and storage capabilities of an electrical flux capacitor that stores electrostatic flux.

BRIEF DESCRIPTION OF THE DRAWINGS

In the drawings of 100.

In the drawings of 100.

In the drawings of 200.

In the drawings of 200.

In the drawings of 300.

In the drawings of 300.

In the drawings of 300.

In the drawings of 300.

In the drawings of 400.

In the drawings of 400.

In the drawings of 500.

In the drawings of 500.

DETAILED DESCRIPTION OF THE DRAWINGS

Figure 1A:
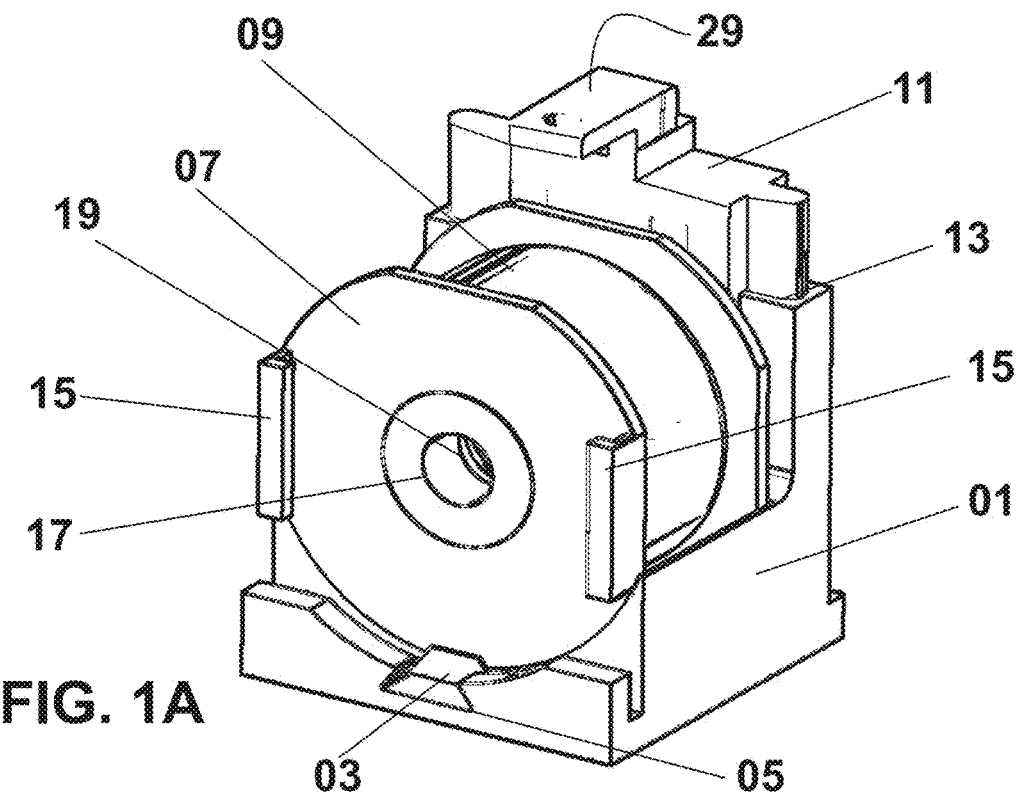
FIG. 1A is a perspective view of the magnetic flux storage 40 capacitor energy harvesting generator.

FIG. 1A/100 is the perspective view of a magnetic flux storage capacitor, energy harvesting generator comprised of a coil and plunger support member 01 with a coil bobbin 07 wound with a substantial coil winding 09 that produces electrical power to an electrical load such as an ISM Band RF transmitter or transceiver module (shown in FIG. 1B/100 as a ISM Band module 21) but not limited to an ISM Band RF transmitter or transceiver module 21, and that can be any electrical load such as an individual LED (not shown) or LED array (not shown). In addition the coil bobbin support 01 has disposed therein a bidirectional (up and down movement) slidable plunger member 11 with a trigger key section 29 that is the mechanical connexion to any external force producing entity, such as a human finger or some other mechanism that can apply a movable mechanical force capable of triggering. The coil bobbin support 01 also has disposed therein the coil bobbin 07 that is wound with the coil windings 09. The coil bobbin has a centered blind hole 17; and the blind hole 17 and its end thin wall (approximately 1 mm thickness) defines a chamber 17 that contains a cylindrical Neodymium magnet 19 (shown in FIG. 2B) that is free to move about omnidirectionally within the chamber 17. The coil bobbin 07 is inserted during assembly, on the coil bobbin support 01, and is secured by a key 03 and key slot 05. The coil bobbin 07 is designed with two opposite slide guides 15 that secure a typical RF micro transmitter module 21 (shown in FIG. 1B). The vertical slides 12a and 12b on the plunger 11 are inserted and slide through the slide guides 13a and 13b.

Figure 1B:
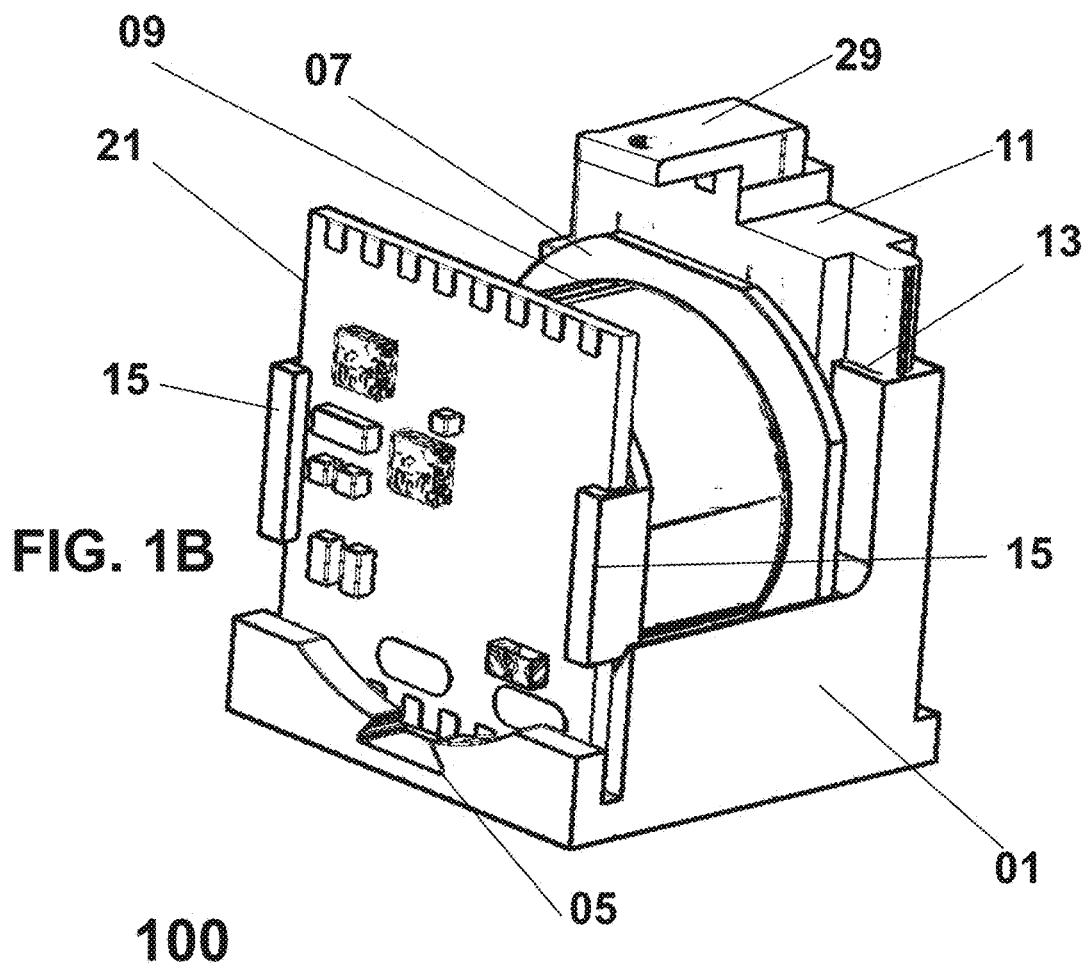
FIG. 1B is a perspective view of the magnetic flux storage capacitor, energy harvesting generator that has disposed and electrically connected (not shown) a RF ISM Band transceiver module.

In the perspective drawing of FIG. 1B, the introduction of a typical RF micro transmitter module that can be utilized for a battery-free transmitter-receiver system to transmit and receive remotely, any useful series of telegram data for the control of various electrical loads, is shown. The receiver (not shown) can have electromechanical or solid-state relays for switching control upon receiving valid encoded data capable of closing and opening the relay switch contacts upon designated decoded commands. The RF transmitter module is connected to the output two terminals of the coil winding and the terminals provide an alternating current supply to power the RF transmitter module. The RF transmitter module selected can have a built-in rectifier, low pass filter, and DC regulator to rectify, filter, and regulate the AC output of the energy harvesting generator, disclosed herein.

Figure 2A:
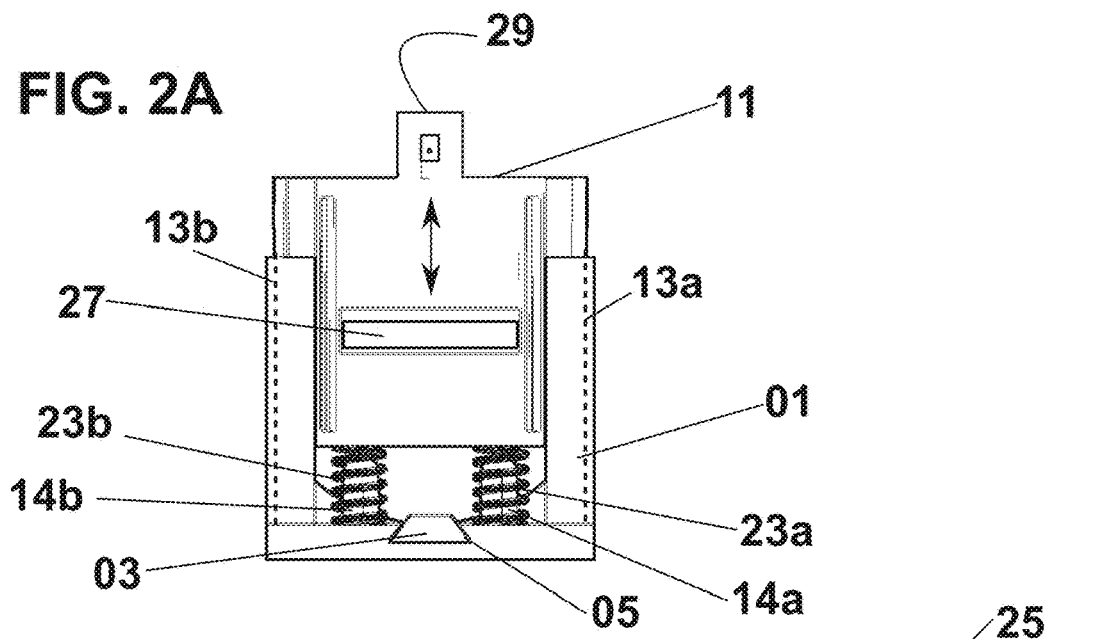
FIG. 2A is a rear view of the magnetic flux storage capacitor, energy harvesting generator showing a first Neodymium magnet component member of the flux capacitor that is the basis of the energy harvesting generator component.

FIG. 2A is a rear view illustrating the plunger 11 that contains the first Neodymium magnet 27 that is disposed within the plunger 11 and fixed in position by some fixation means such as Cyanoacrylate glue. The plunger 11 moves freely down and up, and its normal rest position is up before any triggering down force is applied. This is the condition under the influence of the dual opposite springs 23a and 23b (shown in FIG. 2B). The down and up movement of the plunger during a triggering sequence, is guided by the two opposite plunger guide channels 13a and 13b (shown in FIG. 2B) and this action compresses the two opposite springs 23a and 23b, whereby the two opposite springs are held in position by the two opposite spring tabs 14a and 14b. The generator operation defined by the "magnetic flux capacitor element" of the present disclosure, has the first Neodymium magnet 27 being equivalent to a first plate of an electrical capacitor equivalent and a second Neodymium magnet 19 (shown in FIG. 2B) that is the equivalent of a second plate of an electrical capacitor equivalent. The electrical capacitor equivalency is illustrated and further defined in FIGS. 5A, 5B and 5C.

Figure 2B:
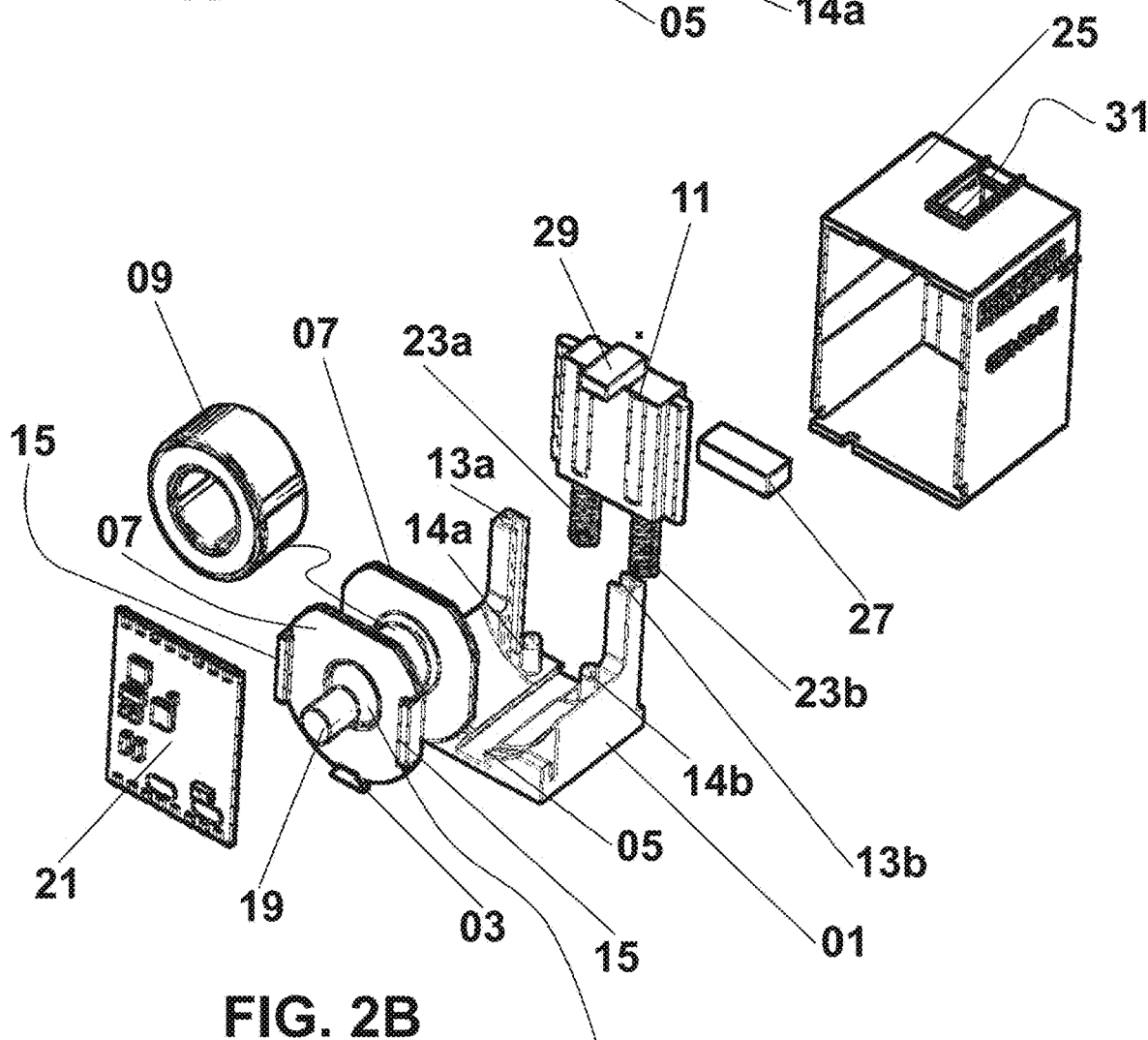
FIG. 2B is an exploded perspective view of all the component members of the magnetic flux capacitor, energy harvesting generator.

The exploded view of FIG. 2B illustrates the components that are assembled in production and disposed within a generator enclosure box 25. There is an opening 31 on top of the enclosure box for the plunger key section 29 to pass through freely during a triggering sequence of normal operation as a limit switch controlling any kind of an electrical load.

The movable magnet 19 situated within the coil's bobbin's bind hole can be a cylindrical magnet having a selected volume and can be a bi-polar magnet or a Halbach magnet array, and can omnidirectionally move about within the blind hole. The thin rectangular magnet 27 is magnetically poled through the dimension of motion (e.g. width) movable relative to the blind hole, and can be a bi-polar magnet or a Halbach magnet array.

A Triggered Sequence of Normal Operation

In the multi-drawing 300, FIGS. 3A, 3B, 3C, and 3D are the major steps of a triggered battery-less and wireless limit switch operation, which generates electrical power to an RF transmitter module as mentioned above.

Figure 3A:
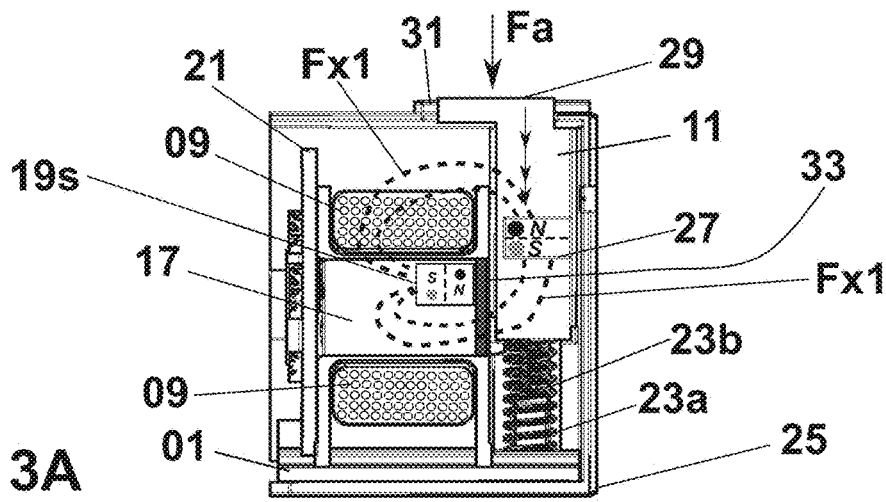
FIG. 3A is a left side view of the magnetic flux capacitor, energy harvesting generator in its initial static state before triggering and where the magnetic flux capacitor is fully charged with concentrated magnetic flux.

FIG. 3A begins with an initial static state of the generator as an applied downward mechanical force Fa is activated that pushes on the plunger key section 29 (a section of the plunger 11) and being that the first Neodymium magnet 27 is disposed and fixed with the plunger 11, it moves in unison with the plunger 11. During this downward movement of the Neodymium first magnet 27, acting and positionally influencing magnetically the second Neodymium rotatable cylindrical magnet 19s that is provided by any substantial external applied mechanical force, the operation for the generation of battery-less multi-cyclic AC power whose time duration is measured in tens to hundreds of milliseconds.

FIG. 3A, illustrates the quiescent (static) state of the energy harvesting "magnetic capacitor" generator in its enclosure unit 25, before any external force is applied to the dual spring 23a and 23b loaded trigger-plunger in its static (pre-triggered) state." In this state, the "magnetic potential energy" is high at a maximum, and "electric potential energy" in the coil is zero, in accordance with Maxwell's equations.

Figure 5A:
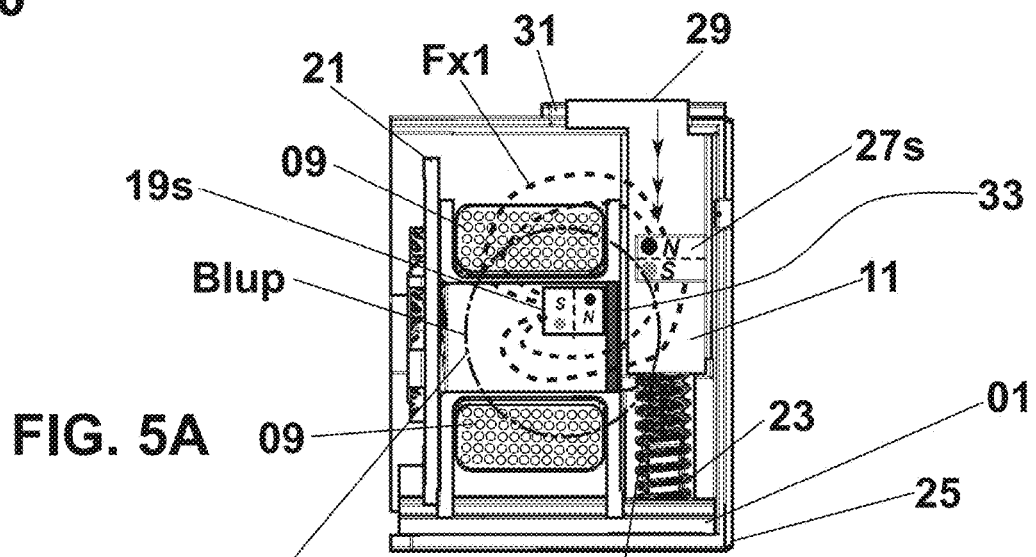
FIG. 5A is a left side view of the magnetic flux capacitor, energy harvesting generator; showing the concentrated static magnetic flux between the first Neodymium bar magnet and the second Neodymium cylinder magnet stored within the coil bobbin blind hole separation wall.

The copper windings 09 are wound around the coil bobbin 07, and the coil bobbin 07 has a blind hole 33 whose diameter is at least 1.27 times greater than the first Neodymium cylinder magnet 19 which acts as a gyrator (flip-flop). The ratio range of typically 1.27 to 1.65 for the blind hole diameter to the Neodymium cylinder magnet 19 height and its diameter is to provide a proper gyrator (flip-flop) cycle and to prevent restriction to the gyrator flip-flop action of the magneto-motive gyrator capacitor magnetic field cycling Fx1-Fx2 discharge and magnetic field re-charge cycling Fx3-Fx4; which is the action of push-down triggering and pop-up external trigger-plunger release return action. The cylinder gyrator magnet (a first magnetic field plate equivalent) in FIG. 3A is in its static state 19s. Pre-triggering has the magnetic gyrator capacitor magnet (the source of the first magnetic field potential energy, which is analogous to a first plate of an electrical capacitor) 19s being held in a static position at the end of the blind hole wall (unity field insulating plate) 17 where it is separated from the dual springs 23a and 23b (23b is visible in FIG. 2A and FIG. 2B) loaded plunger-trigger mechanism 11s and its trigger magnet 27s (the source of the second magnetic field potential energy, which is analogous to a second plate of an electrical capacitor) by the thin (less than 1 mm. because the thinner the blind hole wall is, the more the magneto-motive gyrator capacitor value is, which produces more cooperative magnetic field storage) blind hole wall 33. The thin blind hole 17 wall 33 (the wall acting as an insulating separating wall 33) of the coil bobbin is analogous to the separation insulating plate of a "theoretical equivalent electrical capacitor." The difference in the analogy is that for a real electrical capacitor, the insulating plate can have an electric field permeance greater than one; and the insulating blind hole 17 wall 33 of the coil bobbin will always be unity with a magnetic field. (This is shown in FIG. 5A, FIG. 5B, and FIG. 5C).

Also in FIG. 3A, the dual compression springs 23a and 23b (23b is visible in FIG. 2A and FIG. 2B) are under "non-tension of compression" (static state, pre-triggering). This "non-tension of compression" is a characteristic factor in the overall static magnetic field potential energy; and any substantial triggering motion activity, by an external force, on the plunger-trigger section 29s, which also is a segment of the plunger 11 produces a change in the magnetic flux density through the thin blind hole 17 wall 33. The associated rate of first Neodymium magnet 27 motion change is analogous to the discharging of an electrical capacitor through an electrical current load.

Figure 5B:
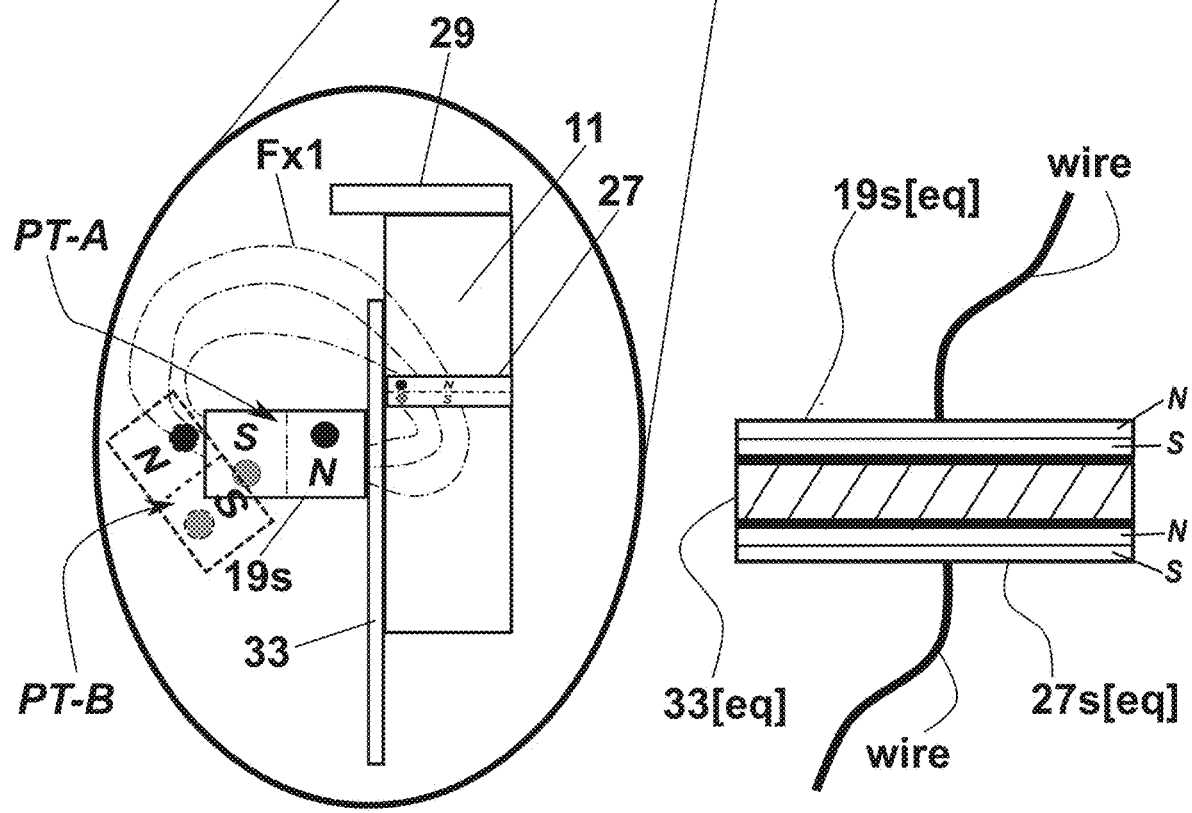
FIG. 5B is a simplified left side view of the magnetic flux capacitor, energy harvesting generator, which in FIG. 5C compares its electrical capacitor equivalent that stores electrostatic flux where the comparison between first and second Neodymium magnets separated by a magnetically permeable non-magnetic separation wall and the first and second electrical plates of an electrical capacitor are separated by an electrical insulator.
Figure 5C:
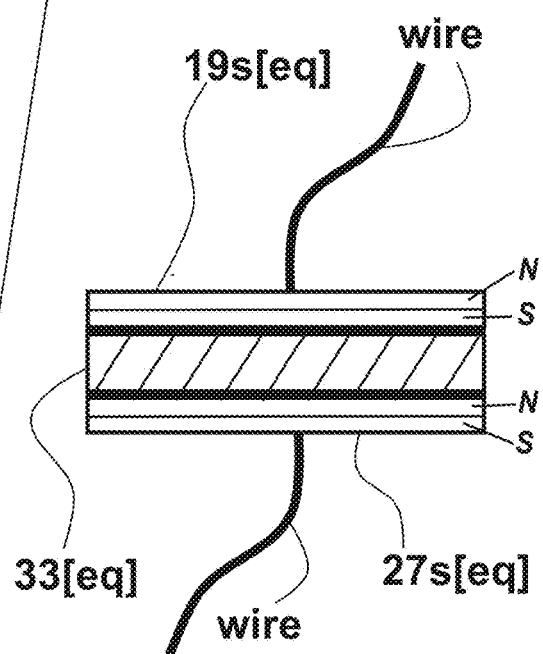

The magnetic field Fx1 in FIG. 3A is in its static magnetic field charged state, which is compared to a charged electrical capacitor (See FIGS. 5B and 5C). The static state is when the magnetic field permeates the coil windings but there is no movement of the "charge magnet 19s."

Figure 3B:
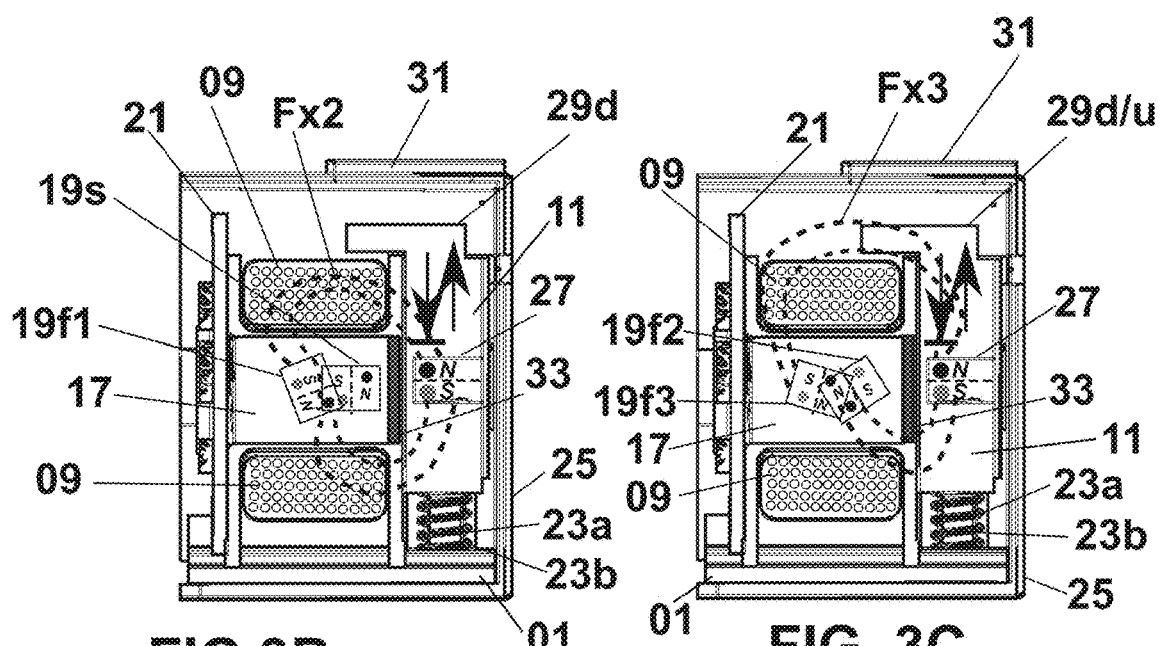
FIG. 3B is a left side view of the magnetic flux capacitor, energy harvesting generator in its push down plunger trigger action.

FIG. 3B represents the "initial-triggering push-down" state of change for the plunger key section 29d (that is part of the plunger 11 component), and the discharge of the static magnetic field that lowers the magnetic potential energy and increases the Lagrangian magnetic kinetic energy release (discharge). During this "state transition phase" the kinetic energy of the changing magnetic field tensors are passing through the coil windings; and causing a change of electrostatic charge into an electrodynamic current flow, in the coil windings, and appear as an alternating form of electromotive force (voltage) at the coil terminals. This alternating form of electromotive force (voltage) is generated because during the "push-down/pop-up state," the trigger magnet 27*d* disposed and fixed within the trigger-plunger section 29*d* is moving bi-directionally in unison with the trigger-plunger 11*d*. This bi-directional (push-down/pop-up) physical movement of the trigger magnet 27*d* generates the magnetic voltage (magnetomotive force, mmf) moving the Neodymium cylinder magnet's position 19*s* at point PT-A to the next position 19*f*1 that is point PT-B [as described mathematically by the integral of (eq. 7)].

Figure 3C:
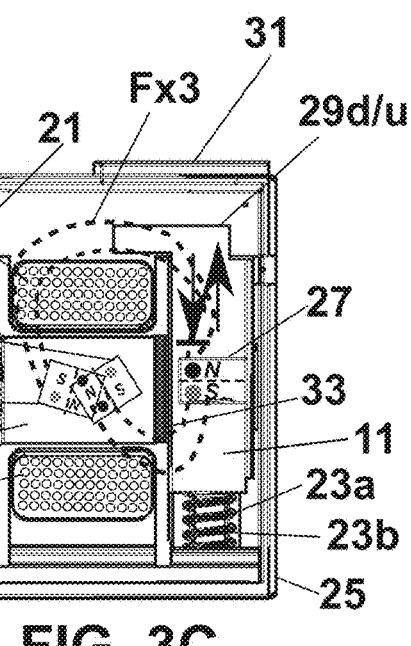
FIG. 3C is a left side view of the magnetic flux capacitor, energy harvesting generator in its spring activated push up plunger trigger action active state.
Figure 3D:
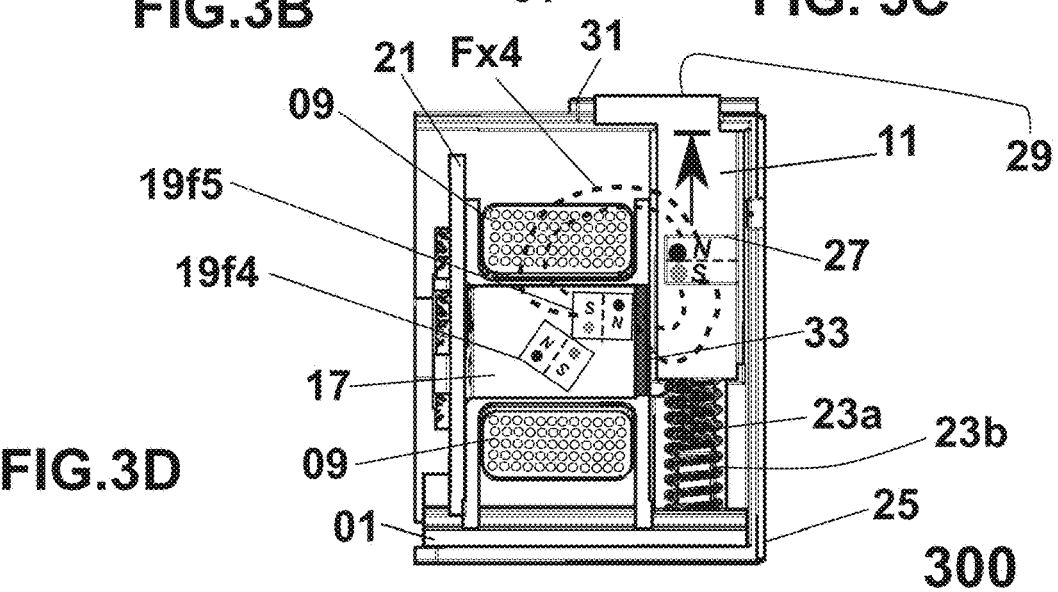
FIG. 3D is a left side view of the magnetic flux capacitor, energy harvesting generator in its returned plunger trigger action static non-triggered state.

Illustrated in FIG. 3C, is when the external applied physical pushdown force that generates the magnetomotive force is released and causes the trigger plunger 29*d/u* with its associated magnet 27 to instantly move upward. This instant upward movement is supplied by the stored potential energy in the now dual compressed spring set 23*a* and 23*b* (23*b* is visible in FIG. 2A and FIG. 2B) moving upward and generating the magnetic voltage (magnetomotive force), now from points PT-B to PT-A. This releases the coil magnet 19*f*2 during point PT-B to 19*f*3 during point PT-A, and the magnet's movement changes the pattern of the magnetic field through the coil winding and producies an electrical voltage at the coil terminals with a polarity opposite to that of the pushdown phase; the pullup phase ends at point PT-A ending the generator cycle of operation as shown in FIG. 3D when the upward spring back activity causes the dynamics of the Neodymium cylinder magnet transitioning from rotating position 19*f*4 to its rest cyclic end static state 19*f*5 (where it initially was held at by the first Neodymium magnet 27). The gyrator omni-directional (plurality rotating flip-flop) motion (is shown in FIG. 5B).

Figure 4A:
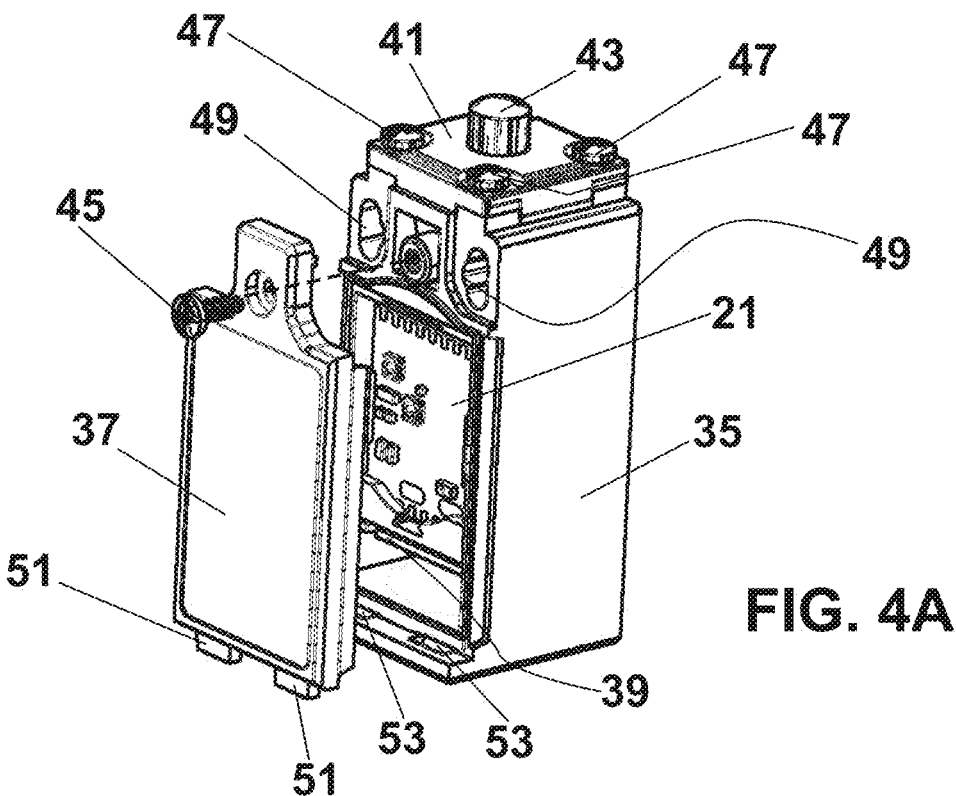
FIG. 4A is a perspective view of the magnetic flux capacitor, energy harvesting generator that is disposed within a typical industrial limit switch enclosure with its securing door open for inspection.

In the multi-drawing 400, FIG. 4A is a perspective illustration as described above and shown in the: [1] multi-drawing 100 containing FIG. 1A as the gyrator (flip-flop) magnetic flux capacitor, and as FIG. 1B as the gyrator (flip-flop) magnetic flux capacitor with an RF micro transmitter module 21 disposed on the gyrator (flip-flop) magnetic flux capacitor and electrically connected to the gyrator (flip-flop) magnetic flux capacitor generator. And shown in [2] the multi-drawing 200 containing FIG. 2A the rear view of the gyrator (flip-flop) magnetic flux capacitor generator; as well as in FIG. 2B the exploded view, also showing the gyrator (flip-flop) magnetic flux capacitor enclosure 25 that is fitted into a typical industrial limit switch enclosure 25 that contains a normally open, and a normally closed set of electromechanical contacts that are the wired-in connexions for controlling the on and off conditions of any electrical load. A terminal block (not shown) and associated connecting wires to any electrical load can be replaced by the apparatus described herein, thus eliminating the terminal block (not shown) and the wires (not shown). The present invention embodiment is designed to replace the terminal block (not shown) as an exact fit-in solution.

Figure 4B:
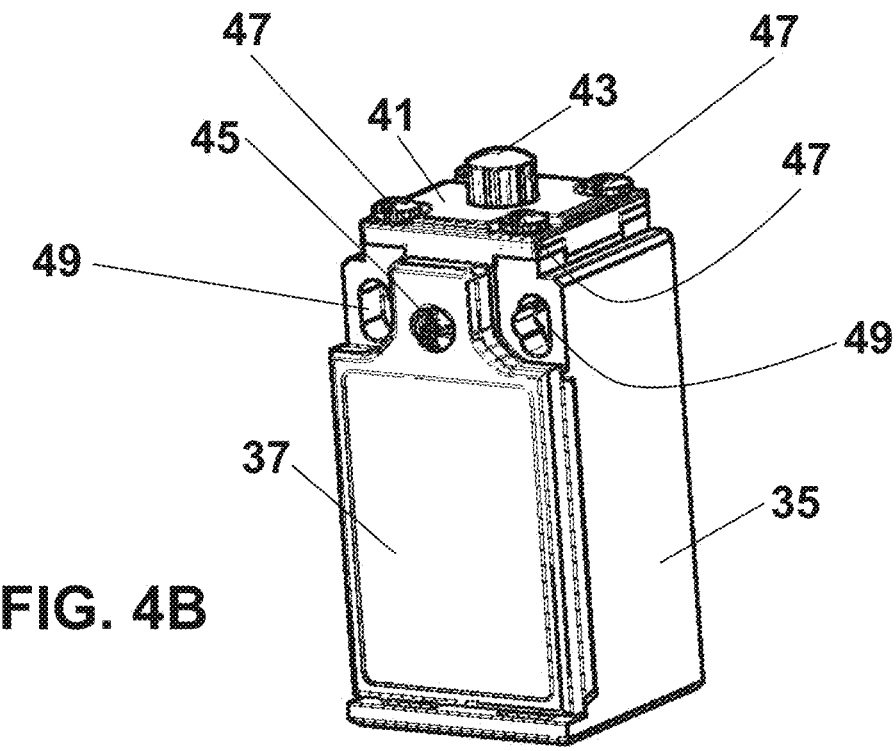
FIG. 4B is a perspective view of the magnetic flux capacitor, energy harvesting generator that is disposed within a typical industrial limit switch enclosure with its securing door closed for securing during normal operation.

FIGS. 4A and 4B illustrates a typical assembled push button battery-less and wireless industrial limit switch with four push button lockdown screws 47 that secure the push button 43 in place on top of the enclosure base 35. There is a door 37 secured with one screw 45 that covers the generator and RF micro transmitter module (as shown in other figures) and the door has two lock-in key tabs 51 that fit into the two key holes 53. The enclosure 35 has two through holes 49 that serve as screw guides to hold the enclosure 35 and its contents; the generator with housing 39 and the RF transmitter module 21.

FIG. 5A is a side cutaway view of the apparatus showing all of its components that makes for an easy production assembly, economical with fewer parts than any prior art limit switch replacement energy harvesters, and more powerful than all related prior art for powering typical RF micro transmitter modules that usually have a programmable RF power output range; and the present embodiment allows for a power range that is the maximum for the FCC non-licenced ISM Band short burst RF transmission; which is 13 milliwatts of RF power measured at one meter distance from the antenna.

FIG. 5A shows the static "non-triggering state" with the Neodymium magnets 27*s* and 19*s* in forced equilibrium by the mutual attractive force of the two magnets in a special position by design. This special position is between a first Neodymium trigger thin slab magnet 27*s* of a certain size, and thin by comparison relative to the Neodymium cylinder magnet 19*s*. These two magnets and the thin non-magnetic coil bobbin blind hole wall define the magnetomotive gyrator (flip-flop) magnetic flux capacitor shown in FIG. 5B and an electrical capacitor in FIG. 5C, which is the electrical capacitor equivalent illustration, where the Neodymium cylinder coil magnet 19*s* is equivalent to a first conductor plate 19*s*[eq] of an electrical capacitor, and the trigger magnet 27*s* (disposed within the plunger 11) is equivalent to a second conductor plate 27*s*[eq] of an electrical capacitor, which are separated by a non-magnetic thin wall 33[eq] of the coil bobbin's blind hole wall 33 that is equivalent to an insulator plate 33[eq] of an electrical capacitor. In FIG. 5C the two wires are for illustration related to an electrical capacitor.

The Magnetic Flux Gyrator-Capacitor

The magnetic flux gyrator-capacitor model or also defined as the capacitor-permeance model—is a lumped-element model for magnetic circuits that can be used in place of the more common resistance-reluctance model. The model makes permeance elements analogous to electrical capacitance rather than electrical resistance. Windings are represented as gyrators, interfacing between the electrical circuit and the magnetic model.

Magnetic capacitance is an alternate name for permeance, (SI unit: H). It is represented by a capacitance in the model magnetic circuit. Some references use CM to denote magnetic capacitance while others use P and refer to the capacitance as a permeance. Permeance of an element is an extensive property defined as the magnetic flux, F, through the cross-sectional surface of the element divided by the magnetomotive force, $\mathcal{F}$ across the element. dS refers to the coil bobbin's "blind hole thickness" (or thinness) and dl is the length (diameter pf the blind hole wall.

$$C_M = P = \frac{\int B \cdot dS}{\int H \cdot dl} = \frac{\Phi}{\mathcal{F}} \quad \text{(eq. 1)}$$

The primary advantage of the gyrator-capacitor model compared to the magnetic reluctance model is that the model preserves the correct values of magnetic energy flow, magnetic field storage, and magnetic field discharge dissipation.

The gyrator-capacitor model is an example of a group of analogies that preserve energy flow across energy domains by making power conjugate pairs of variables in the various domains analogous. It fills the same role as the impedance analogy for the mechanical domain.

A magnetic gyrator is a two-port element used in network analysis and is a real representation of the term and action of the magnetic capacitor. The gyrator is the complement of the transformer; whereas in a transformer, a voltage on one port will transform to a proportional voltage on the other port, in a gyrator, a voltage on one port will transform to a current on the other port, and vice versa.

The role gyrators play in the gyrator-capacitor model is as transducers between the electrical energy domain and the magnetic energy domain. An emf (electromotive force, aka voltage) in the electrical domain is analogous to an mmf (magnetomotive force) in the magnetic domain, and a transducer doing such a conversion would be represented as a transformer. However, real electro-magnetic transducers usually behave as gyrators. A transducer from the magnetic domain to the electrical domain will obey Faraday's law of induction; that is a rate of change of magnetic flux (a magnetic current in this analogy) produces a proportional emf in the electrical domain. Similarly, a transducer from the electrical domain to the magnetic domain will obey Ampère's circuital law, that is, an electric current will produce an mmf.

A winding of N turns is modeled by a gyrator with a gyration resistance of N ohms.

Transducers that are not based on magnetic induction may not be represented by a gyrator. For instance, a Hall effect sensor is modelled by a transformer.

Magnetic Energy

Magnetic energy and electrostatic potential energy are related by Maxwell's equations. The potential energy of a magnet or magnetic moment m in a magnetic field B is defined as the mechanical work of the magnetic force (magnetic torque) on the re-alignment of the vector of the magnetic dipole moment and is equal to:

$$E_{p,m} = -m \cdot B \quad \text{(eq. 2)}$$

while the energy stored in an inductor (of inductance L when a current I flows through it is given by:

$$E_{p,m} = \frac{1}{2} L I^2. \quad \text{(eq. 3)}$$

Energy is also stored in a magnetic field. The energy per unit volume in a region of space of permeability $\mu_0$ containing magnetic field B is:

$$u = \frac{1}{2} \frac{B^2}{\mu_0} \quad \text{(eq. 4)}$$

For a magnetostatic system of currents in free space, the stored energy can be found by imagining the process of linearly turning on the currents and their generated magnetic field, arriving at a total energy of:

$$E = \frac{1}{2} \int J \cdot A \, dV \quad \text{(eq. 5)}$$

where J is the current density field and A is the magnetic vector potential. This is analogous to the electrostatic energy expression:

$$\frac{1}{2} \int \rho \phi dV \quad \text{(eq. 6)}$$

note that neither of these static expressions do apply in the case of time-varying charge or current distributions.

Magnetic Voltage

Magnetic voltage, $V_m$, is an alternate name for magnetomotive force (mmf), $\mathcal{F}$ (SI unit: A or amp-turn), which is analogous to electrical voltage in an electric circuit. Not all authors use the term magnetic voltage. The magnetomotive force applied to an element between point A and point B is equal to the line integral through the component of the magnetic field strength, H.

$$v_m = \mathcal{F} = -\int_A^B H \cdot dl \quad \text{(eq. 7)}$$

The resistance-reluctance model uses the same equivalence between magnetic voltage and magnetomotive force.

Magnetic Current

Not to be confused with Electric current, an electromagnetic field quantity.

Magnetic current, $i_m$, is an alternate name for the time rate of change of flux, $\Phi$ (SI unit: Wb/sec or volts), which is analogous to electrical current in an electric circuit. In the physical circuit, $\Phi$, is magnetic displacement current. The magnetic current flowing through an element of cross section, S, is the area integral of the magnetic flux density B.

$$i_m = \Phi = \frac{d}{dt} \int_S B \cdot dS \quad \text{(eq. 8)}$$

The resistance-reluctance model uses a different equivalence, taking magnetic current to be an alternate name for flux, $\Phi$. This difference in the definition of magnetic current is the fundamental difference between the gyrator-capacitor model and the resistance-reluctance model. The definition of magnetic current and magnetic voltage implies the definitions of the other magnetic elements.

The invention claimed is:

1. An electromagnetic generator comprising:
   a first magnet affixed to a member that is movable upon application of a mechanical force;
   a second magnet disposed in a channel adjacent to the member;
   a coil surrounding the channel; and
   means for mechanically biasing the member to assume a first position relative to said channel when the member is not acted upon by said mechanical force and urging said second magnet to assume a first position within said channel proximal to one magnetic pole of said first magnet, and the member moving to a second position relative to said channel when the member is acted upon by said mechanical force and moving said first magnet to flip said second magnet poles to a rotating position flip within said channel, thus changing the magnet pole orientation of the second magnet in the said channel due to magnet interaction of said first magnet with said second magnet;

wherein the second magnet changes its orientation in the channel to thereby induce a voltage in the coil, and wherein the member is constrained to move in a mechanical guide from said first position to said second position.

2. The electromagnetic generator of claim 1, wherein the means for mechanically biasing the member is at least one mechanical spring or an equivalent thereof.

3. The electromagnetic generator of claim 1, is housed in an enclosure to define a limit switch.

4. The electromagnetic generator of claim 3, wherein the electrical device comprises one of an ISM band transmitter and transceiver.

5. The electromagnetic generator of claim 1, wherein at least one of the first magnet and the second magnet comprises Neodymium.

6. The electromagnetic generator of claim 1, further comprises an electrical device coupled to the coil for receiving electrical energy from the coil when a voltage is induced in the coil.

7. A Magnetic Flux Capacitor Energy Harvesting Generator comprising:

a movable first magnet, situated within a blind hole wire-wound coil bobbin chamber; and said magnet is centrally held in a butted position against said blind hole's inner substantially thin-wall segment, to provide direct mechanical communication with the said inner substantially thin-wall segment, and where said inner substantially thin-wall segment has a thickness of less than or equal to 1.0 millimeters, and a second substantially thin rectangular magnet that is held stationary within a movable trigger element's blind horizontal substantially thin slot that contains said second substantially thin rectangular magnet; and said coil bobbin is attached to a base member, and where said base member has two opposite vertical guide channel posts, and where said guide posts allow for said trigger that contains said rectangular second magnet to move down and up thus describing said trigger action to produce electrical power; and said trigger has two opposite springs connected between said base member and said trigger; and where said rectangular magnet simultaneously moves in conjunction with said movable trigger element's motion, and where the substantially proximal distance between the coil bobbin's outside blind hole segment and said rectangular magnet's magnetic pole is less than or equal to 1.0 millimeters, and said rectangular magnet's magnetic pole's side edge is in the same plane as said trigger's first surface area; and where said trigger's surface area moves down and up smoothly against the outside surface of said coil bobbin's blind hole wall; and as the action of down and up motion of said trigger and rectangular magnet's pole edge surface simultaneously moves down and up over said first magnet, this trigger action causes said first magnet to omnidirectionally gyrate within said blind hole, where said blind hole is substantially larger in volume than that of said first magnet's volume, thus allowing for first magnet's magnetic poles flux line of force to continuously pass through said coil windings of copper wire, and by Faraday's law induces an electrical energy field to establish a voltage potential across the two coil wire terminals for producing power to an electrical load.

8. The Magnetic Flux Capacitor Energy Harvesting Generator of claim 7, wherein said coil bobbin contains a guide key for said coil bobbin to slide into said base member's key slot; so said coil bobbin fits completely within the said base member.

9. The Magnetic Flux Capacitor Energy Harvesting Generator of claim 7, wherein said trigger element contains two distal opposite inline blind holes; and said blind holes accommodate two inserted compression springs.

10. The Magnetic Flux Capacitor Energy Harvesting Generator of claim 7, wherein said base member has two distal opposite vertical inline cylinders that act as placement guides for said two springs.

11. The Magnetic Flux Capacitor Energy Harvesting Generator of claim 7, wherein said horizontally placed rectangular magnet that is inserted within said trigger element slot is situated at a level that has this said rectangular magnet at the same level as said inner first magnet contained within said coil bobbin's blind hole and magnetically attracted to said rectangular second magnet.

12. The Magnetic Flux Capacitor Energy Harvesting Generator of claim 11, wherein said position between said first and second magnets are held against said blind hole substantially thin wall, thus defining a "none triggered quiescent state" with no electrical power being generated until there is a state change due to a trigger movement by a mechanical force acting on said trigger element.

13. The Magnetic Flux Capacitor Energy Harvesting Generator of claim 11 wherein said movable first magnet provides a first magnetic pole plate and said second thin rectangular magnet provides a second magnetic pole plate providing magnetic plates of opposite magnetic poles having therebetween concentrated magnetic flux lines of force which are altered by the movement of said second thin rectangular magnet, causing the movable first magnet to omnidirectionally move all about within said coil blind hole.

14. The Magnetic Flux Capacitor Energy Harvesting Generator of claim 7, wherein said rectangular second magnet has a width-to-height ratio of 3-to-1, and a length-to-height ratio of at least 7.35-to-1; and further said ratios are kept within a +/−5% tolerance.

15. The Magnetic Flux Capacitor Energy Harvesting Generator of claim 7, wherein said movable first magnet situated within said coil bobbin's blind hole is a cylindrical Neodymium magnet having a selected volume.

16. The Magnetic Flux Capacitor Energy Harvesting Generator of claim 7, wherein said second thin rectangular magnet is a Neodymium magnet that is magnetically poled through the width thereof.

17. The Magnetic Flux Capacitor Energy Harvesting Generator of claim 7, wherein said movable first magnet is a bi-polar magnet or a Halbach magnet array.

18. The Magnetic Flux Capacitor Energy Harvesting Generator of claim 7, wherein said second thin rectangular magnet is bi-polar magnet or a Halbach magnet array.

\* \* \* \* \*